J. DARLING.
Combined Harvester and Thrasher.
No. 4,408.
2 Sheets—Sheet 1.
Patented March 7, 1846.
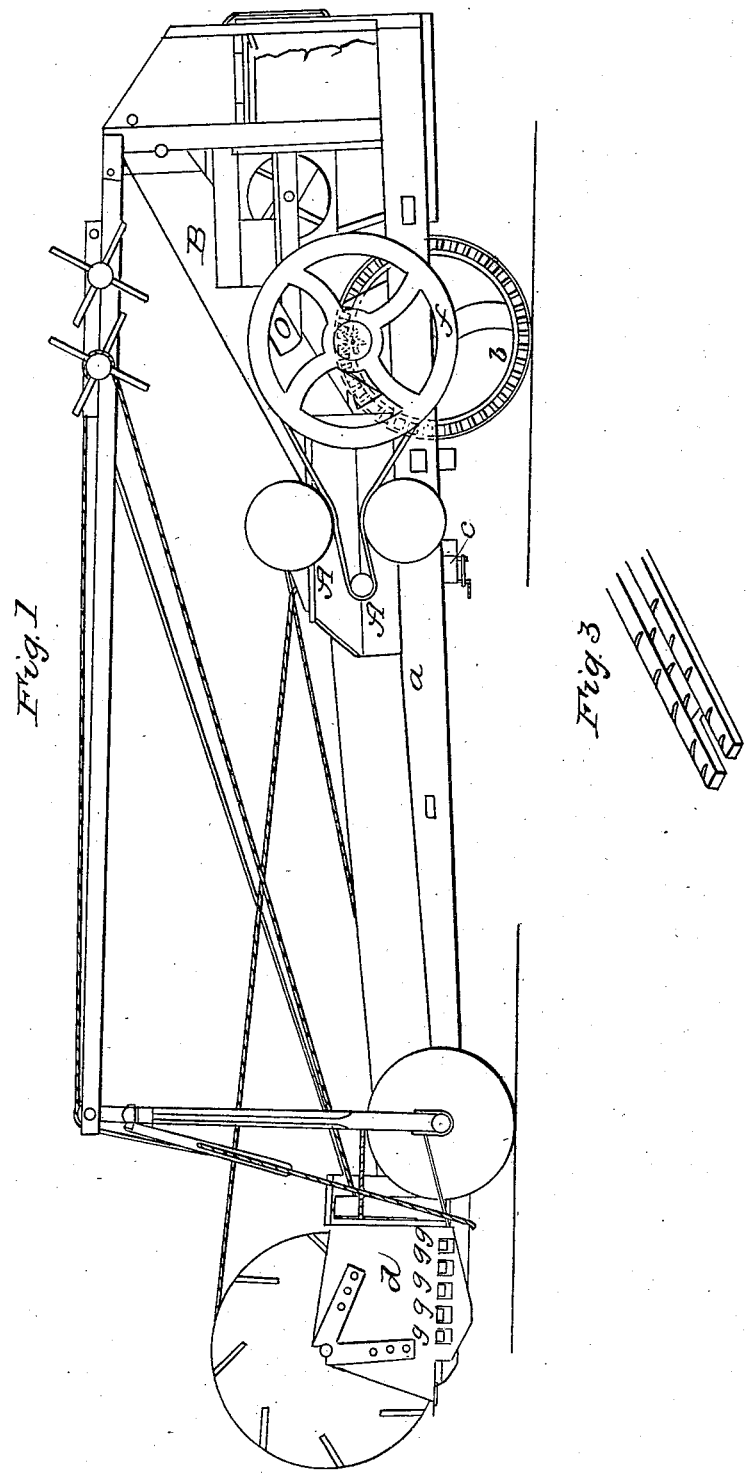

2 Sheets—Sheet 2.
J. DARLING.
Combined Harvester and Thrasher.
No. 4,408. Patented March 7, 1846.
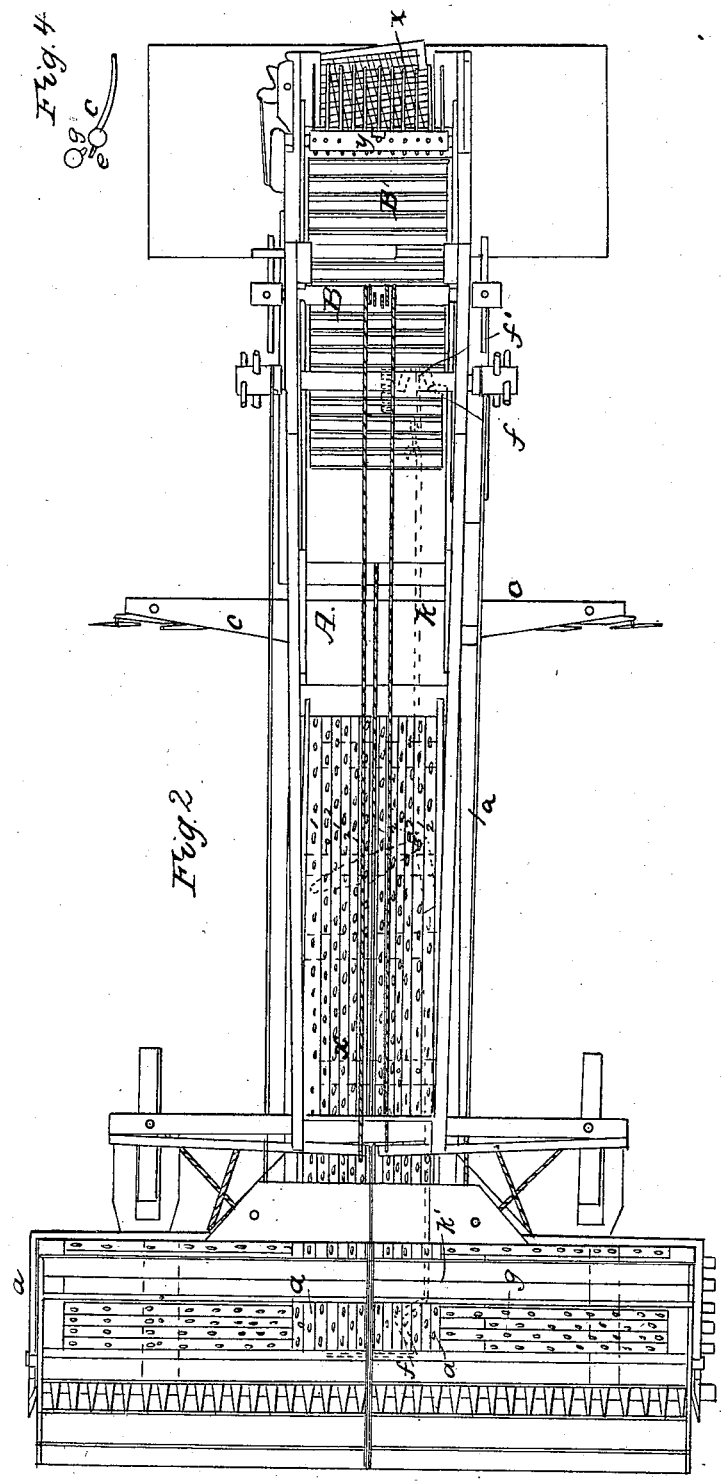

UNITED STATES PATENT OFFICE.

JEREMIAH DARLING, OF ADRIAN P. O., MICHIGAN.

IMPROVEMENT IN REAPING-MACHINES.

Specification forming part of Letters Patent No. 4,408, dated March 7, 1846.

*To all whom it may concern:*

Be it known that I, JEREMIAH DARLING, of Adrian P. O., in the county of Lenawee and State of Michigan, have invented a new and useful Improvement in Machinery for Reaping, Thrashing, and Cleaning Grain at one operation; and I do hereby declare that the following is a full, clear, and exact description of the principle or character thereof which distinguishes my invention from all other things before known, and of the manner of making, constructing, and using the same, reference being had to the accompanying drawings, making part of this specification, in which—

Figure 1 is a side elevation; Fig. 2, a top plan, and Fig. 3 detached view of straw-carrier.

The same letters indicate like parts in all the figures.

The machinery which I employ for this purpose has the following characteristic construction: A long narrow frame, $a$, supports on the front end a reaper, (hereinafter described,) and on the back end a thrashing and winnowing machine. This frame is elevated on three wheels, two of which are placed near its forward end, and the other, $b$, under the thrashing-machine. This latter, $b$, is geared to and drives the moving parts that are placed on the frame. Its tread is broad, and additional friction may be given to it by forming projections radially thereon. The machine is drawn by four (more or less) horses, two on each side, behind the reaping-machine, and hitched to a bar, $c$, fastened transversely across the frame, and projecting on each side sufficiently for that purpose. To the forward end of frame $a$ a traverse cutter-frame, $d$, is attached, along the forward end of which is placed the reaping instrument, the length of which governs the width of swath to be cut. It consists of a series of guides, $e$, formed like saw-teeth, having a straight sickle-edged knife, vibrating endwise back and forth at their base, actuated by a crank, $f'$, on the driving-shaft $f$, connected by pitmen $k$ and $k'$ and a bell-crank, $f'''$, similar to other like constructions, and clearly represented by red lines in Fig. 2. Back of the cutters there is a gathering-platform, $g$, composed of parallel slats, every other one of which is stationary. The others are connected together by cross-bars $x$ $x$, and also with the cutter, as shown in red lines in Fig. 2, which vibrates with them. These slats extend from the end inward toward the center as far as the long frame $a$, which connects the cutter and thrasher. These slats have pointed teeth projecting from their upper sides that incline inward toward the frame $a$, which inclination is more clearly shown in the detached Fig. 3. In moving back and forth they push forward the straw as it is cut toward the center by their inward motion and slip back under it as they recede. The center of the long frame is also filled with similar slats extending from the cutter to the thrasher. These are connected similarly to those described, and both sets are made to move back and forth, the teeth inclining backward. They are all vibrated by the crank $f'$, that acts upon the cutters, the pitman $k$ on said crank having connection with a transverse lever, $l$, one end of which is attached to one series of bars (marked 1) and the other end is connected with the alternate bars, (marked 2,) all of which is clearly shown in red outline in Fig. 2.

The thrashing-machine A is not new, and therefore needs no further description. From this the thrashed grain and straw is elevated by means of an apron, B, of ordinary construction over onto a set of fingers, C, that are on a shaft directly under shaft $y$, and project horizontally over a sieve, $z$. These fingers are vibrated up and down by means of a cam or shaft, $y$, placed just above and behind them, that acts on a projection, $s$, on the finger. This is represented in red lines and more clearly shown in Fig. 4. The other parts of the fan are like those now in use, and the winnowed grain is conveyed into bags below, the straw being thrown off behind.

Having thus fully described my improvement, what I claim as my invention, and desire to secure by Letters Patent, is—

1. The carrying or gathering platform formed of slats with pointed teeth thereon, and moved, substantially as described, with the cutting and thrashing apparatus, as set forth.

2. The mode of steering by pivot-wheels, in combination with the reaping apparatus, as above described.

JEREMIAH DARLING.

Witnesses:
J. J. GREENOUGH,
A. P. BROWNE.